C. H. KOERBER.
TIME RECORDER.
APPLICATION FILED FEB. 16, 1910.

976,375.

Patented Nov. 22, 1910.

2 SHEETS—SHEET 1.

Witnesses

Inventor
CHARLES H. KOERBER
BY Luther V. Moulton
Attorney

C. H. KOERBER.
TIME RECORDER.
APPLICATION FILED FEB. 16, 1910.

976,375.

Patented Nov. 22, 1910.

2 SHEETS—SHEET 2.

Witnesses
H. O. Van Antwerp
Minnie Johnson.

Inventor
CHARLES H. KOERBER
BY Luther V. Moulton
Attorney

THE NORRIS PETERS CO., WASHINGTON, D. C.

UNITED STATES PATENT OFFICE.

CHARLES H. KOERBER, OF IONIA, MICHIGAN.

TIME-RECORDER.

976,375.      Specification of Letters Patent.      Patented Nov. 22, 1910.

Application filed February 16, 1910. Serial No. 544,267.

*To all whom it may concern:*

Be it known that I, CHARLES H. KOERBER, a citizen of the United States of America, residing at Ionia, in the county of Ionia and State of Michigan, have invented certain new and useful Improvements in Time-Recorders; and I do hereby declare the following to be a full, clear, and exact description of the invention, such as will enable others skilled in the art to which it appertains to make and use the same.

Figure 1:
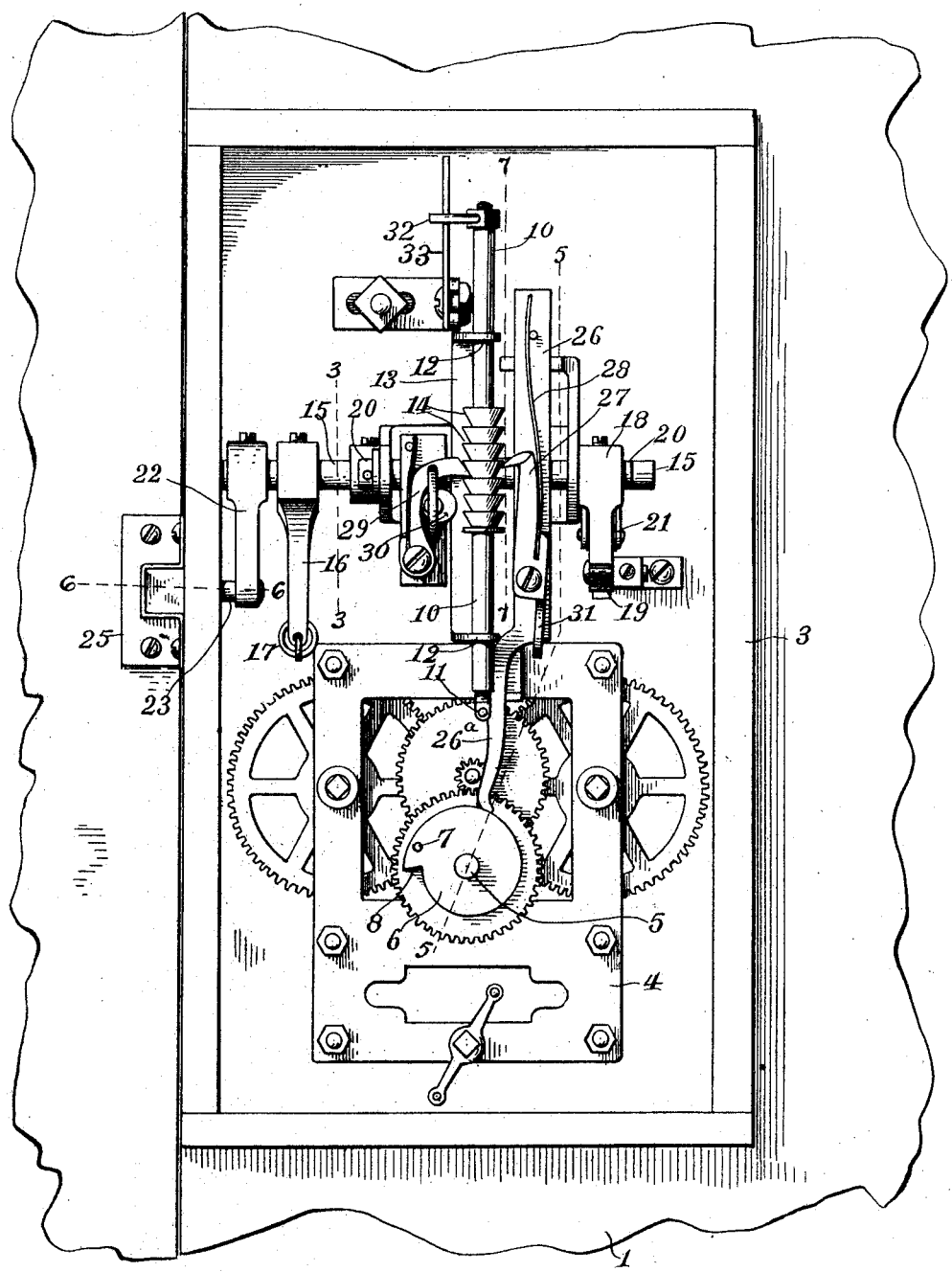
Figure 2:
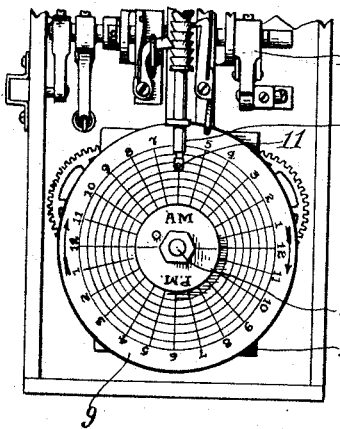
Figure 3:
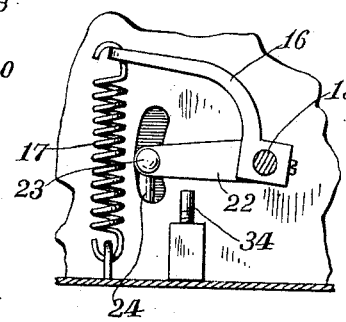
Figure 4:
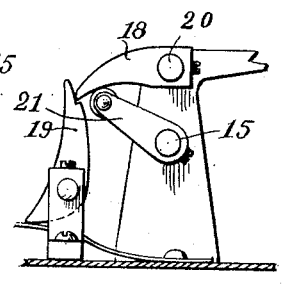
Figure 5:
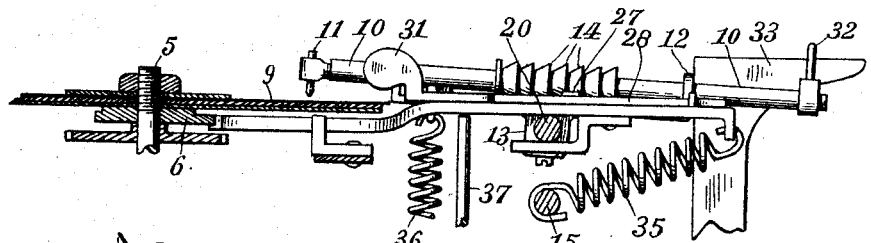
Figure 6:
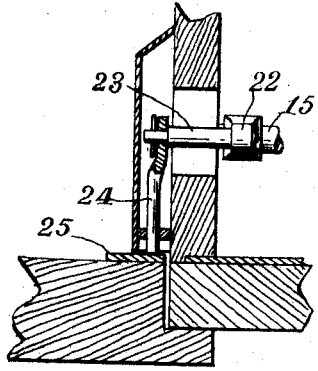
Figure 7:
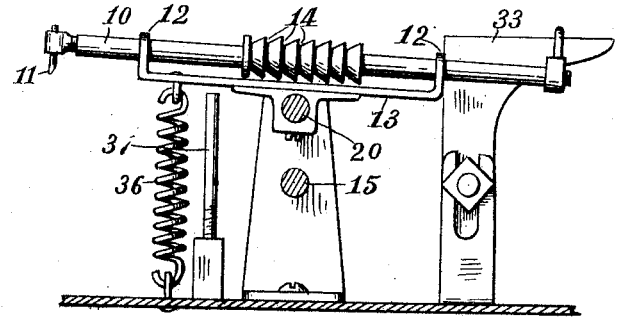
Figure 8:
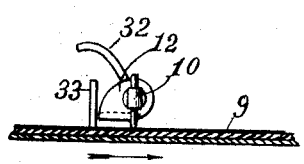
Figure 9:
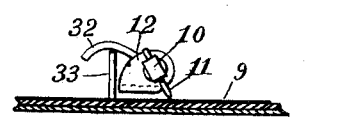

My invention relates to improvements in time recorders and more particularly to devices adapted to record the movements of a door, or other like movable member, and its object is to provide the same with means for automatically recording upon a dial the time and number of times that the member to which the device it attached is opened and closed or moved during a period of several days, and it consists essentially of a clock mechanism adapted to rotate a dial once in twenty-four hours, a needle carried by an arm adapted to bring the needle in contact with the dial whenever the door is opened, means for shifting the needle toward the axis of the dial once in twenty-four hours to record on concentric circles of the dial one for each day, and means for permitting the dial to turn with the needle in contact therewith while the door remains open, and to provide the device with various novel features of construction and arrangement, as will more fully appear by reference to the accompanying drawing, in which:

Figure 1 is a front elevation of a device embodying my invention with the cover of the case removed; Fig. 2 a front elevation of a portion of the mechanism, together with the dial shown on a reduced scale; Fig. 3 a detail of a portion of the rock shaft operated by opening and closing the door; Fig. 4 a detail of a portion of the mechanism for operating the needle bar to puncture the dial; Fig. 5 an elevation in detail of a portion of the dial, the needle bar, and a portion of the operating mechanism therefor, shown in side elevation; Fig. 6 a detail in horizontal section showing a portion of the case and a portion of the mechanism for operating the primary rock shaft; Fig. 7 a side elevation of the needle bar and parts coacting therewith; Fig. 8 an end elevation of the needle bar and a part of the dial with the needle vertically engaging the dial; and, Fig. 9 the same with the needle turned to permit the dial to rotate.

Like numbers refer to like parts in all of the figures.

1 represents a door or other member, the opening and closing or movements of which is to be recorded, and to which the device is preferably attached.

2 is the casing of the door 1.

3 is the case to inclose the apparatus shown with the cover of the same removed.

4 is a clock having a dial shaft 5 adapted to rotate once in twenty-four hours. On this shaft is fixed a cam 6, provided with a pin 7 to drive the dial. This cam has an involute periphery extending once around the same, and having a radial drop 8 where the lesser radius begins and the greater radius terminates.

9 is a dial mounted on the shaft 5 and driven by the pin 7, and preferably provided with seven concentric circles, one for each day of a week, and twenty-four radial lines, representing the twenty-four successive hours in each day, as illustrated in Fig. 2.

10 is the needle bar carrying at its lower end a needle 11 adapted to engage and puncture the dial 9, hereinafter described, and also adapted to drag the needle along the surface of the dial and mark the same, the puncture to indicate the time in the day when the door 1 is opened and the said mark to indicate the time during which the door was allowed to stand open, before closing it again, as hereafter explained.

The needle bar is mounted in bearings 12 on a yoke 13, and is both longitudinally movable and rotative therein, being provided with seven circumferential shoulders 14 in series thereon and spaced apart to correspond to the spacing of the concentric circles on the dial to bring the needle between said circles according as the bar is adjusted longitudinally.

To bring the needle into contact with the dial, the yoke 13 is mounted on a rock shaft 20, and provided with a contractile spring 36, which forces the needle toward the dial, this movement being limited by an adjustable stop 37 to properly puncture the dial, and no more. The needle is held out of contact with the dial by a spring actuated dog 19, which engages an arm 18 fixed on the rock shaft 20, and holds the same against the action of the spring 36, see Figs. 4 and 7.

To raise the needle and engage the dog with the arm, an auxiliary rock shaft 15 is provided having an arm 21 adapted to alternately engage the arm 18 and the dog 19, as shown in Fig. 4. On this shaft 15 is also an arm 16 provided with a spring 17, which tends to turn the shaft 15 and bring the arm 21 into engagement with the dog to release the same from the arm. Another arm 22 is also mounted on the shaft 15, having a pin 23 extending through the side of the case 3 and provided with a push rod 24, which extends inward and engages the plate 25 on the casing 2 when the door is closed. This engagement pushes the arm 22 forward, brings the arm 21 in contact with the lever 18, turns the needle out of contact with the dial, and reëngages the dog 19.

The closing of the door 1, raises the needle clear of the dial, and holds the same until the door is again opened. When the door is opened, the spring 17 turns the shaft 15, brings the arm 21 in contact with the dog 19, and releases the lever 18. This sudden movement brings the needle point 11 down with a sudden movement, due to the action of the spring 36, and pierces the dial as with a hammer blow. If now the door remains open, the movement of the dial rotates the needle bar about its axis to the position shown in Fig. 9. To drag the needle along the surface of the dial and mark the same, a laterally projecting arm 32 is provided at the end of the needle bar opposite to the end carrying the needle, which engages a stop 33 as the bar is rotated by the forward movement of the dial with the point of the needle inserted therein, preventing further rotation of the needle bar and thus maintains contact of the needle with the dial, drawing the needle over the surface of the dial sufficient to mark the same and whenever the door is closed and the needle bar shifted to move the needle away from the dial, the upper end of the bar moves oppositely and this arm and stop thus turns the needle bar about its axis to a position with the needle vertical to the surface of the dial, as illustrated in Figs. 7 and 8.

To shift the needle bar longitudinally and hold the same, a spring actuated dog 29 engages one of the shoulders 14, and retains the bar 10 in adjusted position. This dog will yield to a downward movement of the bar however, which is effected once in twenty-four hours by means of a slide 26 carrying a spring actuated hook 27 adapted to successively engage the shoulders 14. This slide is actuated in one direction by a spring 35 (see Fig. 5) to move the bar downward, and is moved upward by means of an arm 26ª which engages the periphery of the cam 6, which cam moves the slide upward against the action of the spring and permits the slide to drop as the arm reaches the radial shoulder 8 and drops off the same toward the axis. The spring hook 27 in the meantime, has been moved up to engage the next shoulder and as the slide descends, the dog 29 yields and permits the needle bar to be moved down by the space between the respective shoulders, thus bringing the needle opposite the next space between the circles on the dial.

When the needle bar has been moved down to the limit, it is manually restored, preferably once a week, at the time the clock is wound and the dial changed, for which purpose a cam 30 is manually engaged with the dog 29 to release the same from the shoulders 14, and a thumb piece 31 provides means for releasing the hook 27 from the same. The bar 10 can then be manually moved up to starting position.

Obviously the device may be mounted on the casing and the primary rock shaft operated by closing the door, so also various other changes may be made without departing from my invention.

This device is mainly useful in connection with the doors of safes, vaults, and other like receptacles which are commonly opened daily and closed at night, but obviously may be used in connection with various other reciprocable members, such as bolts or locks for various structures as occasion may arise.

What I claim is:—

1. A time recorder, comprising a clock, means for rotating a dial operated by the clock, a pivoted needle bar carrying a needle adapted to puncture the dial and normally out of contact with the same, a spring to move the needle toward the dial, a pawl to hold the needle out of contact with the dial, and means for releasing the pawl operated by movement of a movable member.

2. A time recorder, comprising a clock, means for rotating a dial operated by the clock, a pivoted and rotative needle bar carrying a needle adapted to puncture the dial and normally out of contact therewith, a spring to bring the needle in contact with the dial and puncture the same, a dog to hold the spring under tension and the needle out of contact with the dial, means for releasing the dog adapted to be operated by the movement of a movable member, and means for rotating the needle bar to normal position.

3. A time recorder, comprising a clock, means for rotating a dial operated by the clock, a needle bar mounted on a rock shaft and both rotative and longitudinally movable, a needle in one end of the bar adapted to puncture and mark the dial, means for bringing the needle in contact with the dial operated by the opening of a movable member, means operated by the clock for shifting the needle bar longitudinally at each revolution of the dial, operating means, means for moving the needle out of contact with the dial, and means for rotating the shaft to normal position both operated by closing of the said movable member.

4. A time recorder, comprising means for rotating a dial, a longitudinally adjustable needle bar having a series of shoulders thereon, yieldable means for holding the bar adjusted, a reciprocable spring hook to successively engage the shoulders and adjust the bar, and a cam rotating with the means for rotating a dial to move the hook and adjust the bar.

5. A time recorder, comprising a clock, means for rotating a dial and a cam rotated by the clock, a needle bar pivoted on a transverse axis and carrying a needle to engage the dial, said bar also having a series of shoulders, means for oscillating the bar on its axis operated by the movement of a movable member, a slide moved in one direction by the cam, a spring to move the slide in the other direction, a spring hook on the slide to successively engage the shoulders on the bar, and a spring dog also successively engaging said shoulders.

6. A time recorder, comprising a clock, means for rotating a dial and a cam rotated by the clock, a needle bar carrying a needle to engage the dial, said bar having a series of circumferential shoulders, a pivoted yoke having bearings in which the needle bar is both rotative and longitudinally movable, means for oscillating the yoke operated by the movement of a movable member, a spring dog to hold the bar adjusted, a slide moved by the cam in one direction, a spring to move the slide in the opposite direction, a spring hook on the slide to successively engage the shoulders on the bar, an arm on the bar, and a stop to engage the arm and rotate and hold the bar.

7. A time recorder, comprising means for rotating a dial, a pivoted and rotative needle bar, a needle in the bar adapted to engage the dial, a laterally projecting arm on the bar, and a stop to engage the arm and hold the needle in contact with the dial and also to rotate the bar to normal position when the needle is moved away from the dial.

8. A time recorder, comprising means for rotating a dial, a needle bar carrying a needle to engage the dial, a rock shaft carrying the bar, an arm on said shaft, a spring dog engaging the arm, a primary rock shaft operated by opening and closing a movable member, a lever on said primary shaft engaging the dog to release the same and engaging the arm to reëngage the dog.

9. A time recorder, comprising a rock shaft carrying a needle bar, an arm on the shaft, a spring dog engaging the arm, a primary rock shaft carrying a lever adapted to alternately engage the dog and the arm to release and reëngage the dog, a spring to rotate the primary shaft, and a push rod connected to said shaft to oppositely rotate the same.

10. A time recorder, comprising a clock, means for rotating a dial and a cam rotated by the clock, a yoke mounted on a rock shaft, a needle bar rotative and longitudinally movable in the yoke, circumferential shoulders on the bar, a dog successively engaging the shoulders to hold the bar adjusted, a hook successively engaging the shoulders to shift the bar, an arm on the bar, a stop engaged by the arm to rotate and hold the bar, a slide carrying the hook and moved by the cam, a spring to oppositely move the slide, an arm on the rock shaft, a dog engaging the arm, a primary shaft operated by the movement of a movable member, and a lever on the primary shaft alternately engaging the arm and the dog.

In testimony whereof I affix my signature in presence of two witnesses.

CHARLES H. KOERBER.

Witnesses:
GEORGE C. NICHOLS,
ANNA E. WELTON.